United States Patent [19]
Owensby et al.

[11] Patent Number: 5,484,375
[45] Date of Patent: Jan. 16, 1996

[54] METHOD & APPARATUS FOR SEALING FITMENT TUBES INTO POUCHES

[75] Inventors: Joseph E. Owensby, Spartanburg; Gregory E. McDonald, Simpsonville, both of S.C.

[73] Assignee: W. R. Grace & Co.-Conn., Duncan, S.C.

[21] Appl. No.: 209,129

[22] Filed: Mar. 11, 1994

Related U.S. Application Data

[62] Division of Ser. No. 942,565, Sep. 9, 1992, Pat. No. 5,324,233.

[51] Int. Cl.$^6$ .............................. B31B 1/84; B31B 49/04
[52] U.S. Cl. ...................... 493/190; 493/206; 493/212; 493/213
[58] Field of Search .................................. 493/190, 206, 493/212, 213, 474, 929

[56] References Cited

U.S. PATENT DOCUMENTS

| | | | |
|---|---|---|---|
| 4,027,577 | 6/1977 | Thompson | 493/212 |
| 4,650,452 | 3/1987 | Jensen | 493/213 |
| 4,732,299 | 3/1988 | Hoyt | 493/213 |
| 4,902,269 | 2/1990 | Susini | 493/213 |
| 4,981,463 | 1/1991 | Susini | 493/213 |
| 5,100,369 | 3/1992 | Keeler | 493/213 |

*Primary Examiner*—Jack W. Lavinder
*Attorney, Agent, or Firm*—William D. Lee; Mark B. Quatt

[57] ABSTRACT

The present invention relates to a method of heat sealing fitment tubes to pouches or bags of flexible film using a pair of hot bars. Also disclosed is the use of warm bars or cold bars to cool the hot bar seal. An apparatus for producing pouches with fitment tubes sealed thereto as well as the pouches so produced is also disclosed.

14 Claims, 4 Drawing Sheets

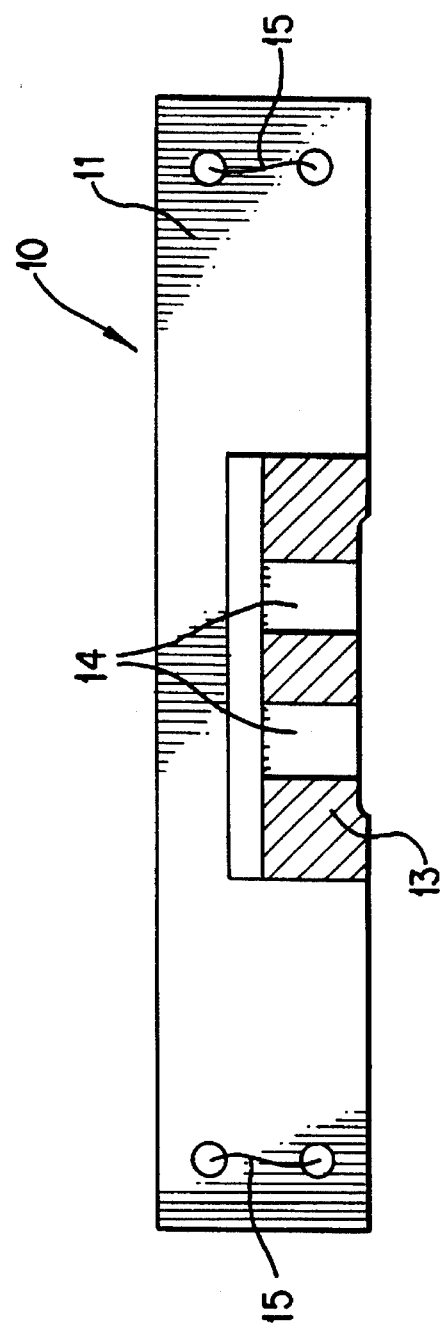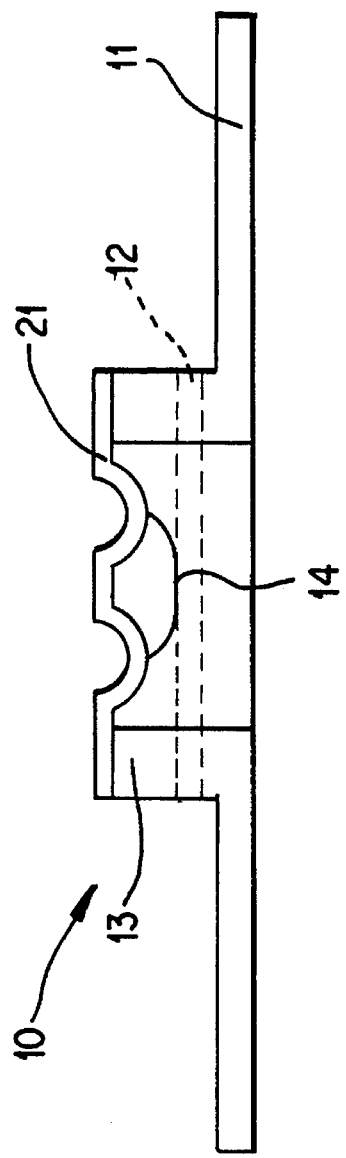

METHOD & APPARATUS FOR SEALING FITMENT TUBES INTO POUCHES

This is a Divisional Application of application Ser. No. 942,565, filed on Sep. 9, 1992 now U.S. Pat. No. 5,324,233.

BACKGROUND OF THE INVENTION

1. Field of the Invention

This invention relates to a method and apparatus for attaching fitment tubes to flexible films suitable for the packaging of medical solutions. In particular, the present invention relates to a method and apparatus for attaching fitment tubes to flexible films in the form of pouches which retain their clarity after filling and heat sterilization of medical solutions contained therein.

2. Description of the Related Art

Currently, it is common medical practice to supply liquids such as medical solutions for parenteral administration in disposable, flexible pouches. These pouches should be characterized by collapsibility, transparency, and adequate mechanical strength. They must also be able to resist the relatively high temperatures required for heat sterilization of their contents, for example in an autoclave. Typically, medical solutions and the like are autoclaved at about 253° F., for periods of 15 to 30 minutes.

Commonly, such flexible pouches are typically made from a highly plasticized polyvinyl chloride. While meeting the requirements mentioned above, polyvinyl chloride may have some undesirable properties for use as a medical solution pouch because of the possibility of migration of plasticizer from the polyvinyl chloride into the medical solution or the other contents of the pouch so that the solution may become contaminated by potentially toxic material. A question has also arisen concerning whether PVC is adequately chemically neutral to medical solutions. It has also been found that polyvinyl chloride becomes brittle at relatively low temperatures.

In these flexible pouches it is desirable to include means for accessing the container (hereinafter "fitments"). Fitments provide a means for establishing fluid communication between the container and the outside environment.

Flexible pouches with fitments can be produced by form, fill and seal packaging machines. Form, fill and seal packaging machines provide an apparatus for forming a web of film into a flexible container housing a desired product. Typically, these machines include a former or mandrel, a fill tube, and heat sealers. The former or mandrel forms or folds the web of film into a tubular shape around a fill or film tube. The film tube is utilized to dispense the material to be packaged into the tubular shaped web of film. In these typical form, fill and seal packaging machines, fitments are attached with an impulse heat sealing system. Typical apparatus of this type is disclosed, for example, in U.S. Pat. No. 4,779,397 issued to Christine et al. Another form of this type of apparatus is disclosed in U.S. Pat. No. 4,695,337 issued to Christine. A vertical form, fill and seal apparatus for making three side fin pouches is disclosed in U.S. Pat. No. 4,947,621 issued to Christine et al.

Fitments suitable for sealing directly to a film web in apparatus as described hereinabove are, for example, those disclosed in U.S. Pat. No. 4,445,550 issued to Davis et al and U.S. Pat. No. 5,110,041 issued to Keeler. These fitments are not adaptable for use on fitment tubes, but instead must be sealed directly to the pouch film web.

Flexible pouches suitable for medical solutions which do not have the drawbacks of PVC and which maintain their clarity as well as their collapsibility, and mechanical strength are known, for example, from U.S. Pat. No. 4,643,926 issued to Mueller and U.S. Pat. No. 4,891,253 issued to Mueller. Sealing fitment tubes to these films using impulse sealing and RF sealing do not produce the necessary seal integrity to prevent leaking, however.

Another method of sealing a fitment tube to a flexible pouch is disclosed in European Patent No. EP-269419-A issued to Craig Med. Prod. Ltd., wherein a separate sleeve of material is placed over the fitment tube and crimped and then heat sealed. This sleeve is a critical part of the invention required to realize the seal between the fitment tube and the flexible pouch.

Traditionally these flexible pouches are made of PVC and the fitment tubes, also of PVC, are sealed to the pouches using RF energy. RF energy, however, does not produce the necessary hermetic seal with many of the flexible films which retain their clarity as well as their flexibility and strength. Likewise, impulse heat sealing has been utilized with PVC in the past, but it too fails to provide the necessary hermetic seals due to limitations of forming the heated wire in the shapes necessary to seal a circular cross section fitment tube to a pair of flat sheets of flexible film.

Thus, there is a need for a method and apparatus to attach fitments to flexible pouches which overcome the limitations of PVC flexible pouches and also produce and maintain a strong, leak free, hermetic seal between the fitments tubes and the flexible film web.

OBJECTS AND SUMMARY OF THE INVENTION

It is an object of the present invention to provide a method of attaching fitments to flexible film pouches.

Another object of the present invention is to provide an apparatus for producing the fitment tube/flexible film seal.

A further object of the present invention is to provide a means of sealing fitment tubes to flexible film pouches which can maintain their hermetic seal integrity under the adverse conditions encountered in use as medical solution containers.

Still another object of the present invention is to provide fitment tubes which accept a wide range of fitments commonly used in the medical field for the application of parenteral solutions.

Accordingly, one form of the present invention relates to a method of attaching fitment tubes to flexible film comprising the steps of: introducing a web of flexible film into a means for forming the side and bottom peripheral seams deeming at least one pouch having one unsealed open end; introducing said pouch to a cutting means and contouring the pouch and removing it from the web of flexible film; introducing at least one fitment tube mounted on a mandrel between the flexible film layers of the unsealed open end of said pouch; introducing said pouch with said fitment tubes to a sealing means; sealing said at least one fitment tube to said pouch and sealing said unsealed open end; cooling the seal using a cooling means; and affixing fitments to the fitment tubes; the improvement comprising using a pair of hot bars as the sealing means to seal said fitment tubes and said pouch open end utilizing a desired temperature and pressure, further characterized by said cooling means being air cooling.

Another form of the present invention relates to a method of attaching fitment tubes to flexible film comprising the steps of: introducing a web of flexible film into a means for forming the side and bottom peripheral seams defining at least one pouch having one unsealed open end; introducing said pouch to a cutting means and contouring the pouch and removing it from the web of flexible film; introducing at least one fitment tube mounted on a mandrel between the flexible film layers of the unsealed open end of said pouch; introducing said pouch with said fitment tubes to a sealing means; sealing said at least one fitment tube to said pouch and sealing said unsealed open end; cooling the seal using a cooling means; and affixing fitments to the fitment tubes; the improvement comprising using a pair of hot bars as the sealing means to seal said fitment tubes and said pouch open end at a desired temperature and pressure and further characterized by using a pair of cold bars as the cooling means at a desired temperature and pressure.

A further form of the present invention relates to a method of attaching fitment tubes to flexible film comprising the steps of: introducing a web of flexible film into a means for forming the side and bottom peripheral seams defining at least one pouch having one unsealed open end; introducing said pouch to a cutting means and contouring the pouch and removing it from the web of flexible film; introducing at least one fitment tube mounted on a mandrel between the flexible film layers of the unsealed open end of said pouch; introducing said pouch with said fitment tubes to a sealing means: sealing said at least one fitment tube to said pouch and sealing said unsealed open end; cooling the seal using a cooling means; and affixing fitments to the fitment tubes; the improvement comprising using a pair of hot bars as the sealing means to seal said fitment tubes and said pouch open end utilizing a desired temperature and pressure, further characterized by using a pair of warm bars as the cooling means at a desired temperature and pressure for a time necessary to bring the temperature of the seal area to a point just above the temperature at which opacity changes in the film during ambient temperature cooling, in the presently preferred film this temperature is 190° F., then removing the warm bars and allowing the seal area to air cool to room temperature.

A still further form of the present invention relates to an apparatus for sealing fitment tubes to a flexible film web comprising a pair of heated bars, each bar comprising a thermally conductive body having a heating means; and a sealing area, having fitment tube locating channels therein.

Yet another form of the present invention relates to an apparatus wherein, each of said bars is further characterized as having a release coating covering the sealing area, including the fitment tube locating channels.

Preferred forms of the invention, as well as other embodiments, objects, features and advantages of this invention, will be apparent from the following detailed description, and Illustrative embodiments thereof, which are to be read in connection with the accompanying drawings.

BRIEF DESCRIPTION OF THE DRAWINGS

FIG. 1 is a top plan view of a sealing bar of the present invention.

FIG. 2 is a front elevation view of a sealing bar of the present invention.

DESCRIPTION OF THE PREFERRED EMBODIMENTS OF THE INVENTION

Figure 3:
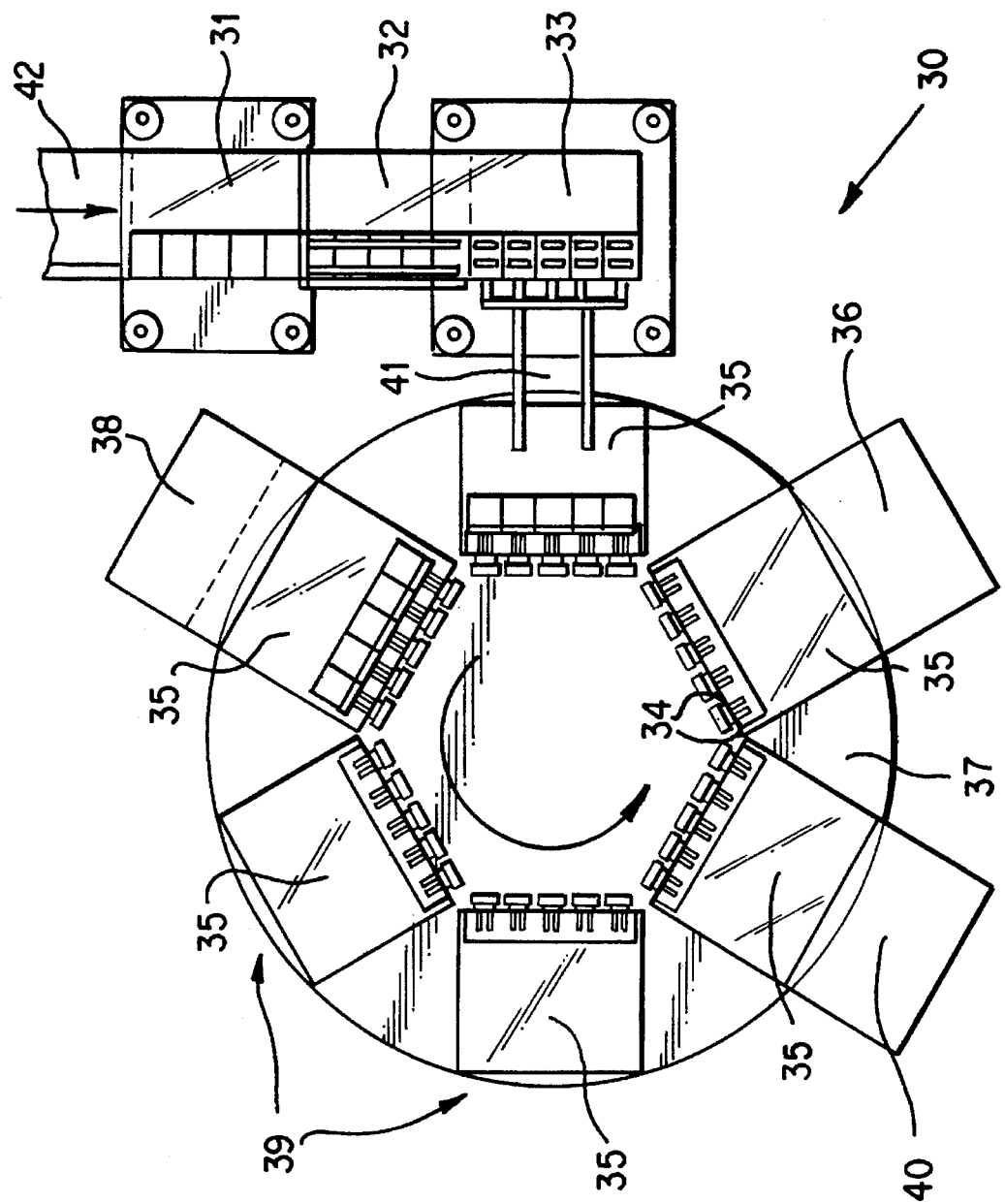
FIG. 3 is a top plan view of an apparatus for producing flexible film medical solution pouches using the sealing bar of the present invention.

The terms "flexible" and the like and "elastomeric" and the like are used herein to define specific polymeric materials as well as characteristics of a resulting pouch or bag whereby improved flexibility and/or collapsibility of the pouch or bag is obtained by the use of these specific polymeric materials. Flexible materials may be characterized by a modulus of preferably less than 50,000 PSI (ASTM D-882-81) and more preferably less than 40,000 PSI (ASTM-D-882-81).

The term "film" and the like refers to a thermoplastic material suitable for packaging and having one or more layers of polymeric materials which may be bonded by any suitable means well known in the art.

The term "polymer", "polymeric", and the like unless specifically defined or otherwise limited, generally includes homopolymers, copolymers and terpolymers and blends and modifications thereof.

The term "interior" and the like is used herein to refer to a layer of a multilayer film which is not a skin or surface layer, or sealant layer, of the film.

The term "surface layer" and the like is used herein to refer to the layer of a multilayer film which becomes the outside surface of the pouch or bag.

The term "sealant layer" and the like is used herein to refer to the layer of a multilayer film which becomes the inside surface of the pouch or bag and is used to form the bag or pouch periphery seals as well as sealing to the fitment tubes.

The term "melt flow" and "melt flow index" is used herein as the amount, in grams, of a thermoplastic resin which can be forced through a given orifice under a specified pressure and temperature within 10 minutes. The value should be determined in accordance with ASTM D 1238-79.

The term "very low density polyethylene" is used herein to define a linear ethylene alpha olefin copolymer with densities below 0.915 gm/cc, preferably between 0.900 to 0.906 gm/cc and including densities as low as 0.860 gm/cc, as measured by ASTM D-1505.

The term "ethylene vinyl acetate copolymer" (EVA) is used herein to refer to a copolymer formed from ethylene and vinyl acetate monomers wherein the ethylene derived units in the copolymer are present in major amounts and the vinyl acetate derived unites in the copolymer are present in minor amounts.

The term "ethylene propylene copolymer" is used herein to refer to a copolymer formed from polypropylene monomer and minor amounts, usually less than 6%, of ethylene.

The term "copolyester" and the like is applied to polyesters synthesized from more than one diol and a dibasic acid. Copolyesters as used herein may also be characterized as copolymers of polyether and polyethylene terephthalate. More preferably copolyesters as used herein may be characterized as polymeric materials derived from 1,4 cyclohexane dimethanol, 1,4 cyclohexane dicarboxylic acid, and polytetramethylene glycol ether, or equivalents of any of the above, as reactants.

The term "modified" and the like is used herein to refer to a polymeric material in which some of all of the substituents are replaced by other materials, providing a change in properties such as improved flexibility or elastomeric properties.

The term "web" and the like is used herein to refer to a tubular film of thermoplastic material which may be split during the pouch or bag making operation or split prior to introduction to the pouch or bag making apparatus. It is also used herein to refer to sheets of thermoplastic material used in the manufacture of pouches or bags.

Flexible film suitable for medical solution pouches and parenteral materials for use with the present invention include generally, for example, films having a core layer of high density polyethylene, two intermediate layers comprising very low density polyethylene, and outer layer comprising an ethylene propylene copolymer or flexible copolyester, a sealant layer comprising a heat sealable polymeric material such as modified ethylene propylene copolymer, and two polymeric adhesive layers bonding the intermediate layers to the outer and sealant layers respectively. Suitable specific examples are disclosed for example in U.S. Pat. No. 4,891,253 issued to Mueller and hereby incorporated by reference. A preferable flexible film suitable for medical solution pouches and parenteral materials for use with the present invention include generally, for example, films having a sealant layer of ethylene propylene copolymer, modified ethylene propylene copolymer, or flexible copolyester, one or more interior layers including elastomeric polymeric materials, and an outer layer of ethylene propylene copolymer or a flexible copolyester such as disclosed, for example, in U.S. Pat. No. 4,643,926 issued to Mueller and hereby incorporated by reference. The currently preferred flexible film for use with the present invention is a multilayer film comprising a sealant layer of rubber modified ethylene propylene copolymer, an adhesive layer comprising a blend of rubber modified ethylene propylene copolymer and low density polyethylene, an interior layer of low density polyethylene, an adhesive layer of ethylene methacrylate and an outer layer of copolyester.

Yet another flexible film suitable for use in producing pouches or bags is one comprising at least one layer formed from a polymeric blend which includes about 40% to 60%, by weight, of any ethylene and vinyl-acetate copolymer and about 60% to 40% by weight, of an elastomeric polyolefin such as disclosed for example in U.S. Pat. No. 4,687,711 issued to Vietto et al and hereby incorporated by reference.

The flexible pouches may be of any desired size and shape. Typically, for medical solutions for parenteral administration the flexible pouches are generally rectangular in shape with rounded corners and having dimensions of about 180 mm wide by 350 mm long. It is to be appreciated that square corners and shapes other than rectangular may be produced within the teaching of the present invention and that such other shapes, corner geometries and sizes are contemplated by the present invention. It is to be further appreciated that these parameters and how to achieve them are well understood in the art and may be determined without undo experimentation by a routineer in the art.

Fitment tubes suitable for use in the present invention may be made of a single layer of polymeric material or may be made of multilayer polymeric material. The outside of the fitment tubes have a composition which is heat sealable to the sealant layer of the flexible film or can be hermetically sealed to the sealant layer of the flexible film. Suitable examples of fitment tube material include for example PVC tubing and preferably, a multilayer thermoplastic material having an outer layer of ethylene propylene copolymer, an adhesive layer of a ethylene vinyl acetate copolymer and an inside layer of PVC. Most preferably the fitment tubes are the multilayer thermoplastic material hereinabove disclosed which have been electrically crosslinked as is well understood in the art.

Suitable fitments include those commonly used and well understood in the art. These include for example, fitments as disclosed in U.S. Pat. No. 5,026,352 issued to Anderson and U.S. Pat. No. 4,324.423 issued to Pitesky. The preferred fitment shape is one having a circular cross section, but any desirable cross sectional shape which allows for hermetic sealing of the fitment to the fitment tubes is suitable. It is to be appreciated that the fitments may be attached to the fitment tubes either before or after the fitment tubes are sealed to the flexible film pouches.

It has now been surprisingly found that fitment tubes as hereinabove described may be hermetically sealed to flexible film pouches hereinabove described using a "hot bar" sealing means. It has been further found that the use of the hot bar sealing means with subsequent use of a cold bar can also produce the improved fitment tube seals of the present invention under certain conditions. It has yet further been found that the use of the hot bar sealing means in conjunction with a "warm bar" can produce the Improved fitment tube seals of the present invention. The term "hot bar" and the like is used herein to refer to the sealing bar of the present invention used at a temperature of from about 250° F. to about 500° F. preferably 350° F. The term "warm bar" and the like is used herein to refer to the sealing bar of the present invention used at a temperature of from about 72° F. to about 250° F., preferably 200° F. The term "cold bar" and the like is used herein to refer to the sealing bar of the present invention used at a temperature of from about 40° F. to about 72° F., preferably 55° F. Turning now to FIGS. 1 & 2, FIG. 1 shows a top plan view of the sealing bar 10 of the present invention including body 11, mounting holes 15, sealing area 13, having release coating 21 (FIG. 2) thereon, and having fitment tube locating channels 14 therein. FIG. 2 shows a front elevation view of the sealing bar 10 of FIG. 1 having body 11, heating, cooling or warming entry and exit ports 12, sealing area 13, having fitment tube locating channels 14 and release coating 21. The sealing bar 10, when utilized as a hot bar, may be heated by known means including heated fluid through ports 12 or electrically as is well known in the art. The hot bar is preferably heated using electrical heating means. A sealing bar 10, when utilized as a warm bar, may be heated by known means including heated fluid through ports 12 or electrically as is well known in the art. The warm bar is preferably heated using electrical heating means. The sealing bar 10 utilized as a cold bar, may be cooled using known cooling means, preferably by passing chilled fluid through ports 12. The currently preferred chilled fluid is chilled water.

It is preferable to use a pair of hot bars 10 with a pair of cold bars 10 because it is the fastest and easiest sealing method. However, some flexible film and fitment tube combinations will not seal acceptably under such conditions and therefore the use of air cooling or a pair of warm bars 10 may be advantageously used. Additionally, in some instances it will only be necessary to utilize a pair of warm bars to effectuate the hermetic seal between the fitment tubes and the flexible film, with or without the use of a pair of cold bars. These parameters will be readily apparent to one skilled in the art without undo experimentation.

The sealing bar may be made of any suitable material, preferably metal, such as for example, stainless steel, aluminum, copper, other non-ferrous metal, and alloys thereof, most preferably aluminum. The sealing bars may also be made of ceramic materials well known in the art.

The sealing bars 10 are always used in pairs. Thus, there is always an upper sealing bar 10 and lower sealing bar 10 positioned such that the flexible film and the fitment tubes are clamped between the upper and lower sealing bars 10 under pressure. Both sealing bars are heated, warmed and/or cooled to the same temperature. The pressure used to clamp the film and fitment tubes during sealing and/or cooling is from about 200 psi to about 400 psi, preferably about 275 psi.

In all instances the sealing bar 10 has a release coating covering the sealing area 13. The release coating may be either non-compliant or compliant. The term "compliant" and the like is used herein to refer to a release coating which allows some movement of the fitment tubes in relation to the flexible film layers during the sealing process. The term "non-compliant" and the like is used herein to refer to a release coating which does not provide for movement of the fitment tubes in relation to the flexible film layers during the sealing process. Release coatings may be any coating which can hold its integrity at the processing temperatures it is exposed to and which will not stick or seal to the fitment tubes or flexible film. Currently preferred noncompliant release coatings include tetrafluoroethylene, such as TEFLON brand tetrafluoroethylene and glass filled tetrafluoroethylene. A preferred coating is a tetrafluoroethylene particle coating infused into the surface of the metal hot bar body. This preferred coating may be obtained from General Magnaplate Corp. of Linden, N.J., using their NEDOX® SF-2R. TUFFRAM® 604 or TUFFRAM® 615 coatings. Currently preferred compliant release coatings include aluminum particle containing silicone rubber, such as for example, COHRlastic® conductive silicone rubber available from CHR industries of New Haven, Conn.

The use of the sealing bars of the present invention will be best understood when taken in conjunction with FIG. 3 wherein a preferred embodiment of an apparatus for the manufacture of flexible film pouches with fitment tubes is shown. Particularly. FIG. 3 shows a top view of an apparatus 30 suitable for making flexible film pouches with fitment tubes of the present invention. The method and apparatus of the present invention will be disclosed by describing a single cycle of the method and apparatus. In practice the flexible film web 42 having two layers of film is fed into a peripheral sealing means 31, by a feeding means (not shown). The peripheral sealing means makes the seals which define the sides and bottom edges of the flexible film pouches. These pouches still having an open top end are then transferred, by a transfer means 32 to a culling means 33, the cut pouches are now transferred by transfer means 41 to platten means 35 located on indexing table 37. The fitment tube sealing means is a pair of sealing hot bars 10 (not shown) located in port sealing means 38. Before the cutting and heat sealing takes place, fitment tubes (not shown) are cut to size and loaded on mandrels 34, located on platten means 35 indexed to fitment tube loading means 36. The now loaded mandrels 34 are moved into position for insertion into the flexible film pouches by indexing means 37, the transfer means 41 places the open end of the flexible film pouch around the fitment tubes. Next the indexing means 37 moves the flexible film pouches with inserted fitment Lubes to port seal means 38 where the sealing of the fitment tubes and the open top end of the pouches is accomplished using sealing means 10 (not shown). The indexing means 37 then cycles the flexible film pouches with fitment tubes through at least one cooling means station 39 and finally to a product ejection means 40. At this point the platten means 35 returns to the fitment loading means 36 and the cycle repeats, it is to be appreciated from FIG. 3 that there preferably are as many platten means 35 as there are stations so that the process is a continuous automated one, as is well understood in the art, it is also to be appreciated that fitments may be attached to the ends of the fitment tubes during the automated process either before or after sealing of the fitment tubes is accomplished as is also well understood in the art.

While the present invention has been shown where the flexible film pouches are made and fitment tubes sealed thereto and then filled with a product at a later time it is to be appreciated that the pouches may be filled immediately after completion of the fitment sealing operation and further that the pouches may be made in a vertical position and filled either before or after the fitment tubes are sealed into place.

Figure 4:
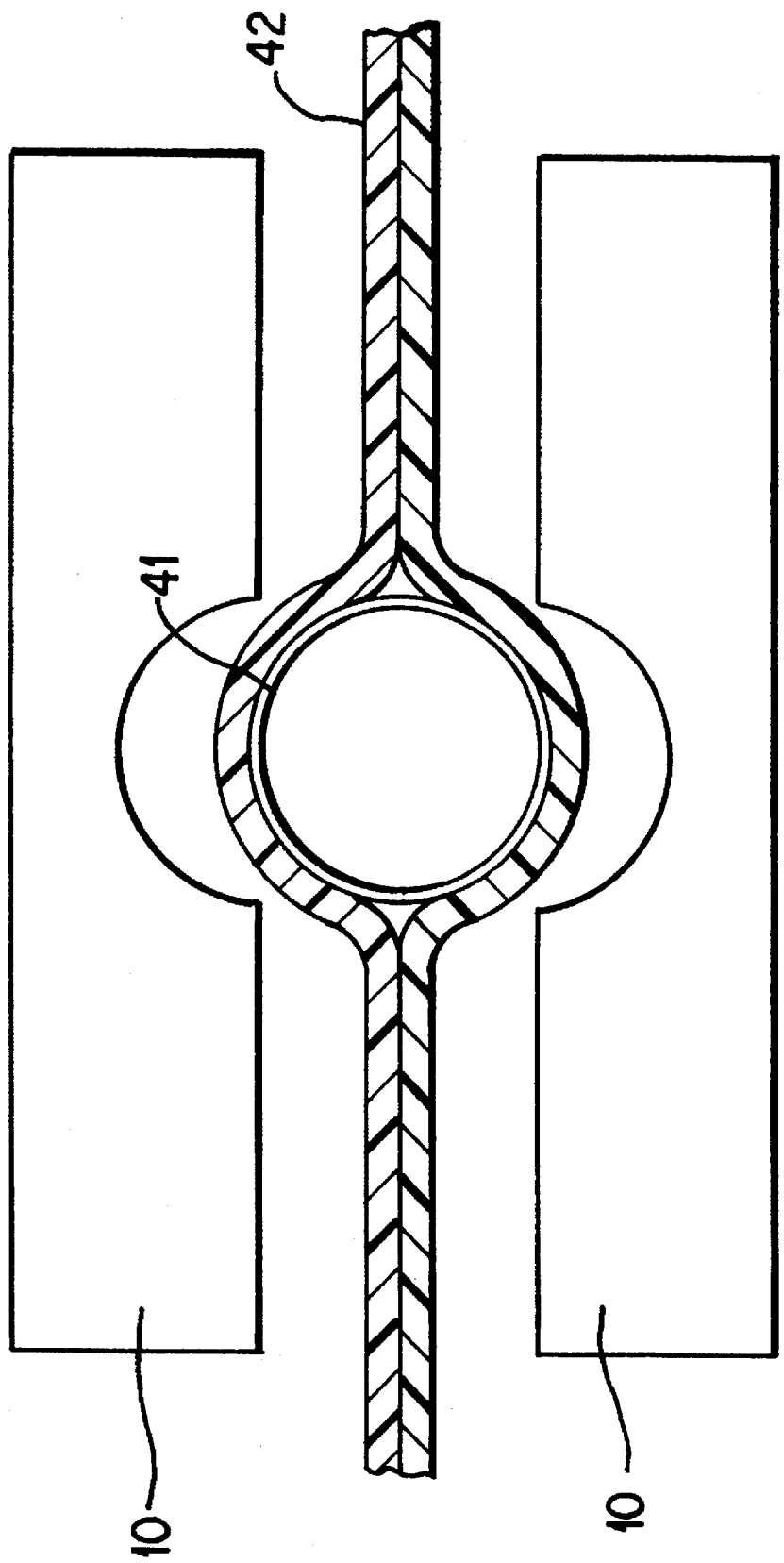
FIG. 4 is a plan view of a pair of sealing bars with a fitment tube in position between the two layers of a flexible film pouch ready to be sealed together.

FIG. 4 shows a plan view of a pair of hot bars 10, positioned for sealing use, between which is positioned a fitment tube 41 between flexible film layers 42 ready to be sealed together upon the pair of hot bars 10 being pressed together under pressure.

Figure 5:
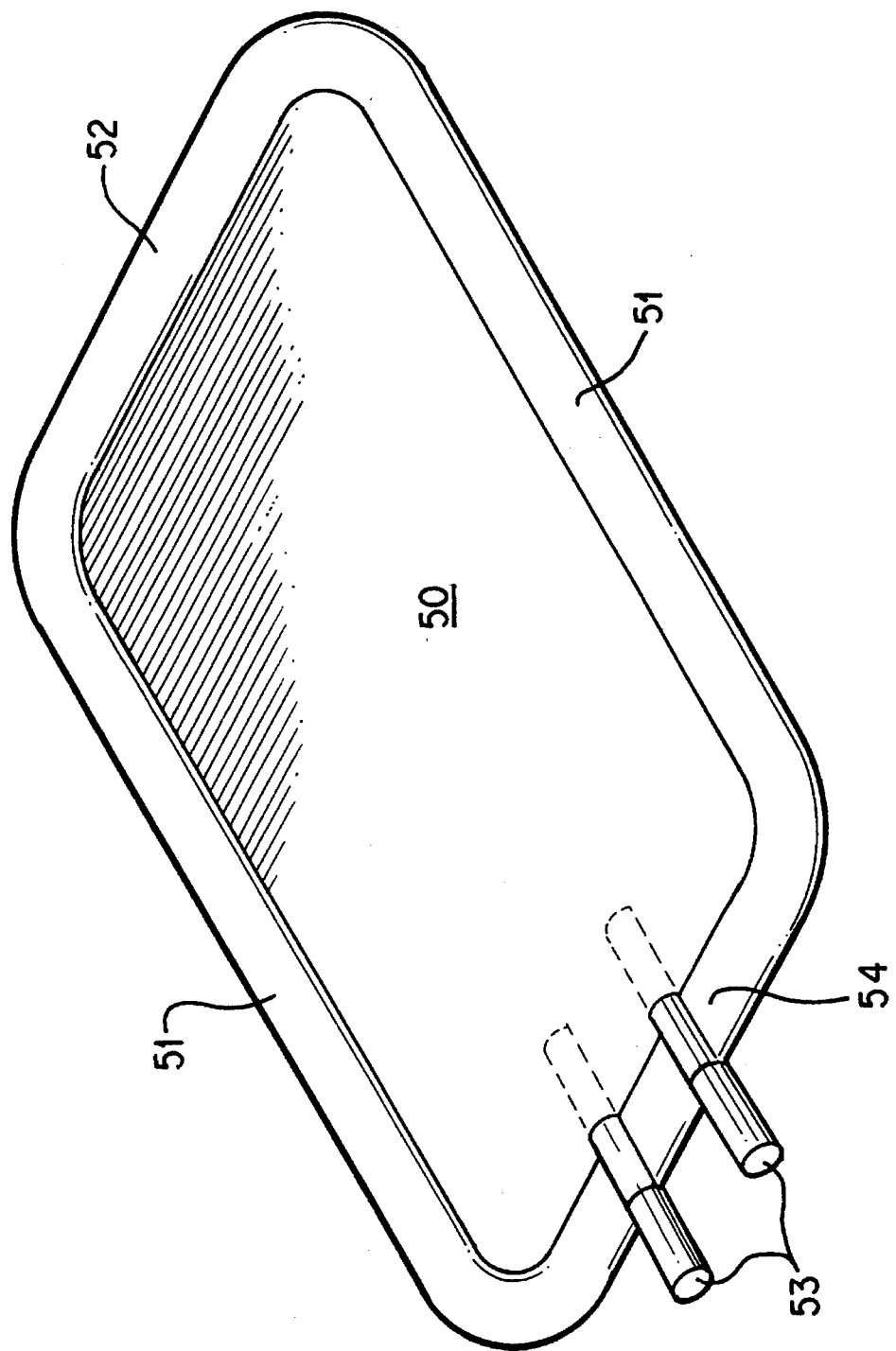
FIG. 5 is an isometric view of a flexible pouch with fitment tubes according to the present invention.

FIG. 5 shows an isometric view of the flexible film pouch 50 of the present invention having side seams 51, bottom seam 52, fitment tubes 53 sealed at top seal 54.

Although the illustrative embodiments of the present invention have been described herein with reference to the accompanying drawings it is to be understood that the invention is not limited to those precise embodiments, and that various other changes and modifications may be effected therein by one skilled in the art without departing from the scope or spirit of the invention.

What is claimed is:

1. A method of attaching fitment tubes to flexible film comprising the steps of:
   a) introducing a web of flexible film into a means for forming the side and bottom peripheral seams defining at least one pouch having one unsealed open end;
   b) introducing said pouch to a cutting means and contouring the pouch and removing it from the web of flexible film;
   c) introducing at least one fitment tube mounted on a mandrel between the flexible film layers of the unsealed open end of said pouch;
   d) introducing said pouch with said fitment tubes to a sealing means;
   e) sealing said at least one fitment tube to said pouch and sealing said unsealed open end:
   f) cooling the seal of step e) using a cooling means; and
   g) affixing fitments to the fitment tubes;
the improvement comprising using a pair of hot bars as the sealing means to seal said fitment tubes and said pouch open end at a desired temperature and pressure, and further characterized by using a pair of cold bars as the cooling means of step f) at a desired temperature and pressure.

2. The method as claimed in claim 1, wherein said pair of hot bars have a temperature of about 350 Degrees F.

3. The method as claimed in claim 1, wherein said pair of hot bars seal the fitment tubes to the film web at about 275 psi.

4. The method as claimed in claim 1 wherein, at least two fitment tubes are sealed to each pouch.

5. The method as claimed in claim 1 wherein a plurality of pouches have fitment tubes sealed thereto simultaneously.

6. The method as claimed in claim 1 wherein, said pair of hot bars have a temperature of from about 250° F. to about 500° F.

7. The method as claimed in claim 1 wherein, said pair of hot bars seal the fitment tubes to the film web at from about 200 psi to about 400 psi.

8. The method as claimed in claim 1 wherein, said cutting means is a die cutting means.

9. The method as claimed in claim 1 wherein, said cutting means is a steel rule cutting means.

10. The method of claim 1 wherein said pair of hot bars has a temperature of about 350 degrees F.

11. The method of claim 1 wherein said pair of hot bars seal the fitment tubes to the film web at about 275 psi.

12. A method of attaching fitment tubes to flexible film comprising the steps of:
  a) introducing a web of flexible film into a means for forming the side and bottom peripheral seams defining at least one pouch having one unsealed open end;
  b) introducing at least one fitment tube mounted on a mandrel between the flexible film layers of the unsealed open end of said pouch;
  c) introducing said pouch with said fitment tubes to a sealing means;
  d) sealing said at least one fitment tube to said pouch and sealing said unsealed open end to form a seal therebetween;
  e) cooling said seal using a cooling means;
  f) introducing said pouch to a cutting means and contouring the pouch and removing it from the web of flexible film; and
  g) affixing fitments to the fitment tubes;

the improvement comprising using a pair of hot bars as the sealing means to seal said fitment tubes and said pouch open end at a desired temperature and pressure, and further characterized by using a pair of cold bars as the cooling means of step e) at a desired temperature and pressure.

13. The method of claim 1 wherein said pair of hot bars has a temperature of about 350 degrees F.

14. The method of claim 12 wherein said pair of hot bars seal the fitment tubes to the film web at about 275 psi.

* * * * *